United States Patent
Rautenbach et al.

(10) Patent No.: US 9,239,250 B2
(45) Date of Patent: Jan. 19, 2016

(54) SAFETY PIN SYSTEM

(71) Applicant: HAMILTON SUNDSTRAND CORPORATION, Windsor Locks, CT (US)

(72) Inventors: Helperus Ritzema Rautenbach, Tempe, AZ (US); Nick Ruegsegger, Peoria, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 233 days.

(21) Appl. No.: 14/089,100

(22) Filed: Nov. 25, 2013

(65) Prior Publication Data

US 2015/0013587 A1    Jan. 15, 2015

Related U.S. Application Data

(60) Provisional application No. 61/846,283, filed on Jul. 15, 2013.

(51) Int. Cl.
*B64D 25/14*    (2006.01)
*B64D 45/00*    (2006.01)
*G01D 7/00*    (2006.01)
*F16B 19/02*    (2006.01)

(52) U.S. Cl.
CPC *G01D 7/00* (2013.01); *B64D 25/14* (2013.01); *B64D 45/00* (2013.01); *F16B 19/02* (2013.01)

(58) Field of Classification Search
CPC .......... A62B 1/20; B64D 25/14; B64D 45/00
USPC ............. 116/1, 200; 182/48; 193/25 B, 25 C; 244/1 R, 224, 905
See application file for complete search history.

(56) References Cited

U.S. PATENT DOCUMENTS

| | | | | |
|---|---|---|---|---|
| 2,733,042 A * | 1/1956 | Culbertson | ............. | F16K 31/56 128/205.24 |
| 4,167,862 A * | 9/1979 | Gould | ................. | E05B 73/0005 244/1 R |
| 4,290,568 A * | 9/1981 | Vollmoeller | ........... | B64D 25/10 244/1 R |
| 5,161,754 A | 11/1992 | Duggal | | |
| 5,908,178 A | 6/1999 | Sandhagen | | |
| 7,994,939 B2 * | 8/2011 | Salvaudon | ............... | B64D 1/04 102/254 |
| 2009/0084655 A1 | 4/2009 | Hentges | | |
| 2010/0019097 A1 * | 1/2010 | Probasco | ................ | B64F 1/005 244/224 |
| 2013/0256571 A1 * | 10/2013 | Cancel | ................... | B64D 25/14 251/90 |

OTHER PUBLICATIONS

European Search Report issued in EP Applicaton No. 14176153.6-1754; Dec. 12, 2014; 5 Pages.

* cited by examiner

*Primary Examiner* — Richard A Smith
(74) *Attorney, Agent, or Firm* — Cantor Colburn LLP

(57) ABSTRACT

A safety pin system for a product is provided and includes a safety pin disposable in a receiving element to disable the product, an obstruction disposable in a blocking position of a product disability indicator and a streamer configured to pass through an opening associated with the product and attached at opposite ends thereof to the safety pin and the obstruction. The opening and the obstruction are sized such that, when the obstruction is disposed in the blocking position with the streamer passed through the opening and the safety pin disposed in the receiving element, the obstruction is irremovable from the blocking position until the safety pin is removed from the receiving element.

10 Claims, 3 Drawing Sheets

SAFETY PIN SYSTEM

CROSS-REFERENCE TO RELATED APPLICATIONS

This non-provisional application claims the benefit of prior to U.S. Provisional Application 61/846,283, which was filed on Jul. 15, 2013. The entire contents of U.S. Provisional Application 61/846,283 are incorporated herein by reference.

BACKGROUND OF THE INVENTION

The subject matter disclosed herein relates to a safety pin system and, more particularly, to a safety pin system for use with a product.

In aerospace and other similar applications, certain products are installed in their appropriate installation locations with safety pins inserted into components of those products. In an exemplary case, a line replaceable unit (LRU) of an aircraft could be installed in an aircraft with safety pins inserted into a torque tube assembly and a gas charged cylinder assembly. In order for the product to be used properly, the safety pins must be removed. But since the safety pins can be difficult to see, the safety pins often include or are attached to streamers that identify when the safety pins are inserted or removed.

It is often the case, however, that the streamers get tucked behind the face of the product or are otherwise hidden from view. In such cases, the user cannot easily determine that the safety pins are or are not inserted into the torque tube assembly or the gas charged cylinder. As a result, the LRU could be placed in use or operated improperly.

BRIEF DESCRIPTION OF THE INVENTION

According to one aspect of the invention, a safety pin system for a product is provided and includes a safety pin disposable in a receiving element to disable the product, an obstruction disposable in a blocking position of a product disability indicator and a streamer configured to pass through an opening associated with the product and attached at opposite ends thereof to the safety pin and the obstruction. The opening and the obstruction are sized such that, when the obstruction is disposed in the blocking position with the streamer passed through the opening and the safety pin disposed in the receiving element, the obstruction is irremovable from the blocking position until the safety pin is removed from the receiving element.

According to another aspect of the invention, a safety pin system is provided and includes a product including an interface by which an operational condition of the product is reviewable, an opening and a receiving element, a safety pin disposable in the receiving element to disable the product, an obstruction disposable in a blocking position at which the obstruction blocks the interface from being viewable as an indication that the product is disabled and a streamer configured to pass through the opening and attached at opposite ends thereof to the safety pin and the obstruction. The opening and the obstruction are sized such that, when the obstruction is disposed in the blocking position with the streamer passed through the opening and the safety pin disposed in the receiving element, the obstruction is irremovable from the blocking position until the safety pin is removed from the receiving element.

According to yet another aspect of the invention, a safety pin system is provided and includes a product including an interface by which an operational condition of the product is reviewable, first and second openings and first and second receiving elements, first and second safety pins respectively disposable in the first and second receiving elements to disable the product, an obstruction disposable in a blocking position at which the obstruction blocks the interface from being viewable as an indication that the product is disabled and first and second streamers configured to pass through the first and second openings, respectively, and attached at opposite ends thereof to the first and second safety pins, respectively, and the obstruction. The first and second openings and the obstruction are sized such that, when the obstruction is disposed in the blocking position with the first and second streamers passed through the first and second openings, respectively, and the first and second safety pins disposed in the first and second receiving elements, respectively, the obstruction is irremovable from the blocking position until the first and second safety pins are removed from the first and second receiving elements, respectively.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, an end product of an aircraft such as an evacuation system requires two safety pins. Both need to be removed after installation of the product on the aircraft to ensure proper functionality of the product. However, since the product resides under a decorative cover during service, colored streamers attached to the safety pins are not always clearly visible to indicate whether the safety pins have or have not been removed. In some cases, therefore, it can be easy for an operator to forget to remove the safety pins, which might impact proper operation.

As described below, a free end of each streamer on each safety pin is tied to a rigid or semi-rigid, non-clear view obstructing card. A pressure gauge of a line replaceable unit (LRU) is normally visible through a window in its decorative cover and requires inspection daily. A view obstructing card resides over the pressure gauge and is held in place by elastic loops on either side. The view obstructing card is too large to fit through these loops but each safety pin will feed through one of the loops trapping the card in place and obstructing view of the pressure gauge. Removal of the card requires each pin to be removed and fed through its corresponding loop ensuring that both safety pins are removed. Inspection of the pressure gauge during shipping and prior to installation of LRU on an aircraft can be achieved by stretching the elastic loops and pulling the view obstruction card away from the pressure gauge.

Figure 1:
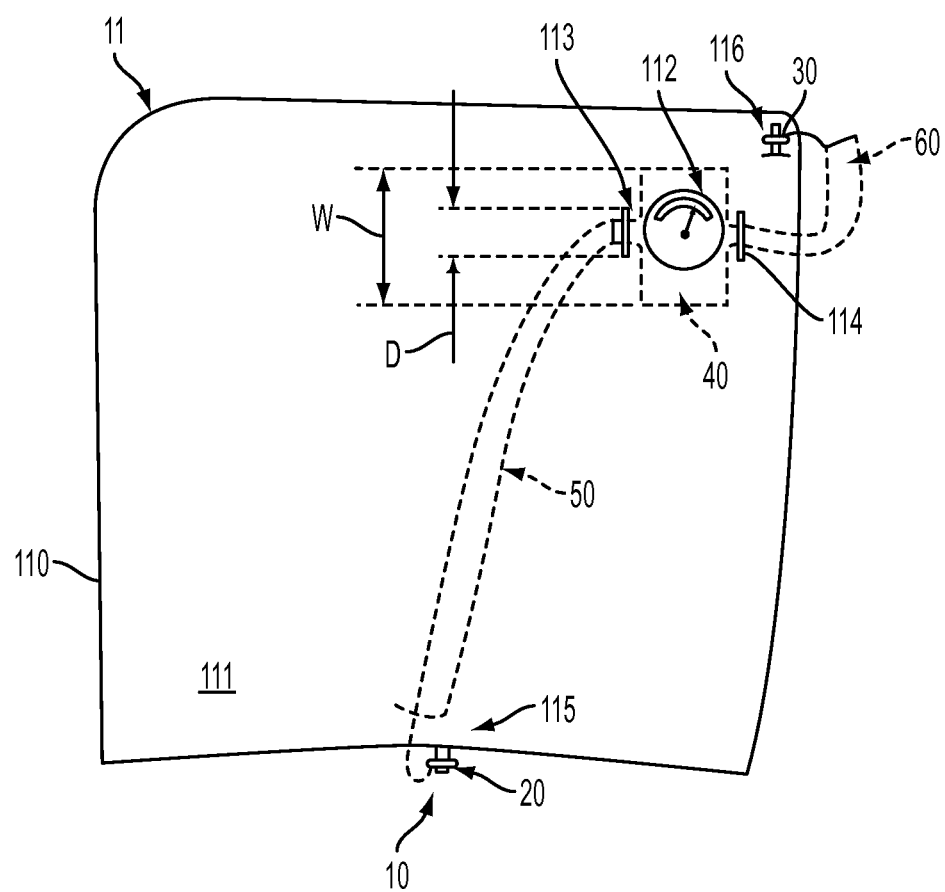
FIG. 1 is a diagrammatic view of a safety pin system in accordance with embodiments.
Figure 2:
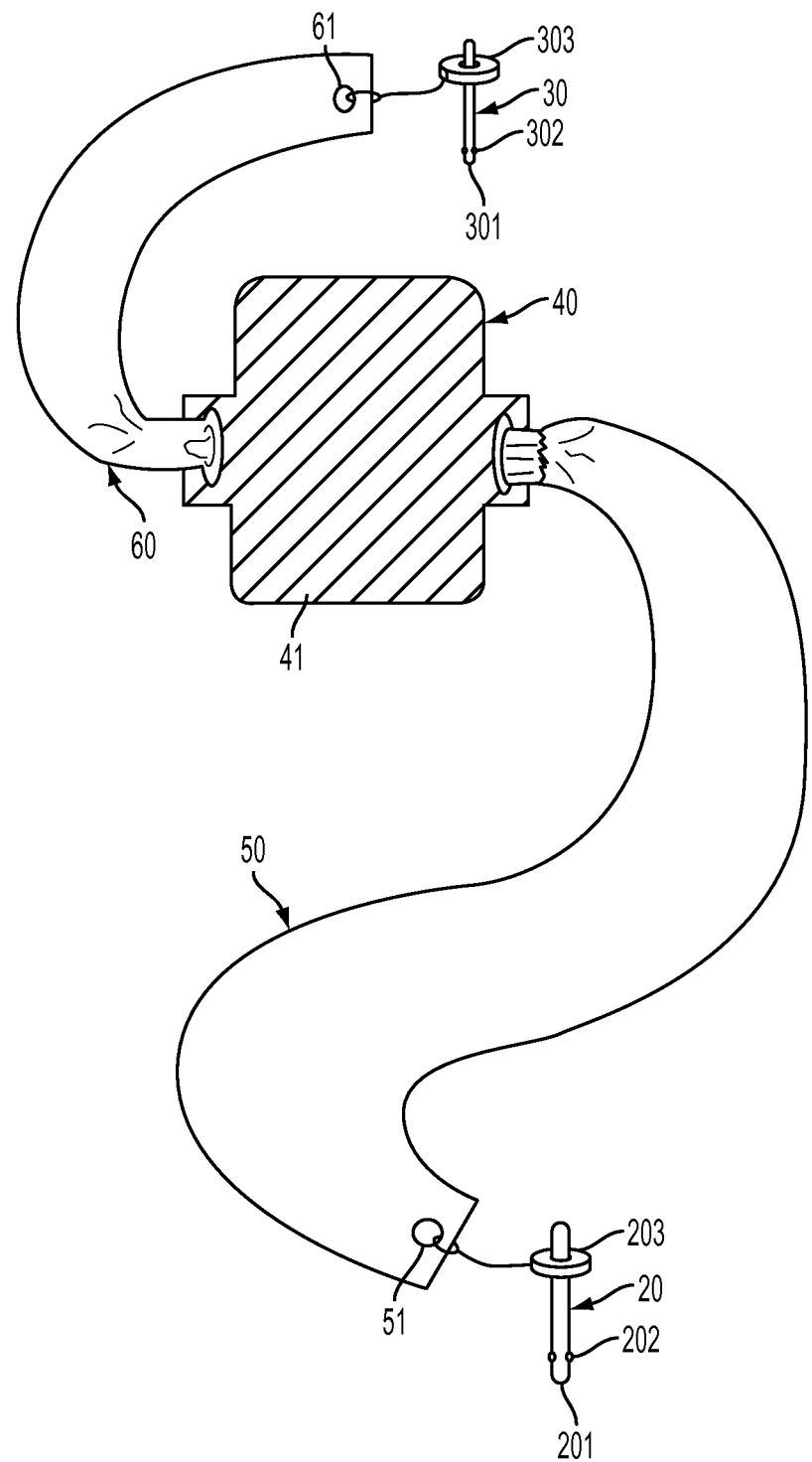
FIG. 2 is a diagrammatic view of components of the safety pin system of FIG. 1 in accordance with embodiments.

With reference to FIGS. 1 and 2, a safety pin system 10 is provided. The safety pin system 10 includes and is usable with a product, such as a line replaceable unit (LRU) 11, such as an evacuation system. The LRU 11 includes a body 110 having a front face 111, which may be covered by a decorative cover, an interface 112, such as a pressure gauge, which may be disposed on the front face 111 and by which an operational condition of the product is viewable. The LRU 11 further includes first and second openings 113 and 114 (e.g., openings formed by the front face 111 and elastic or inelastic loops or hooks attached to the front face 111) and first and second receiving elements 115 and 116. The first and second openings 113 and 114 may be disposed on the front face 111 proximate to the interface 112. The first receiving element 115 may be disposed on a bottom portion of the body 110 and may be associated with a torque tube (not shown). The second receiving element 116 may be disposed on or near a side portion of the body 110 and may be associated with a gas charged cylinder (not shown).

The safety pin system 10 further includes a first safety pin 20 that is disposable in the first receiving element 115, a second safety pin 30 that is disposable in the second receiving element 116, an obstruction 40 and first and second streamers 50 and 60. The product is initially manufactured, shipped and provided to the customer or user with the first safety pin 20 disposed in the first receiving element 115 and with the second safety pin 30 disposed in the second receiving element 116 such that the product is disabled until it is placed in use. When the product is placed in use, the first and second safety pins 20 and 30 are removed from the first and second receiving elements 115 and 116 such that the product is enabled.

The first and second safety pins 20 and 30 may have various shapes and sizes. In accordance with embodiments, they may each include a shank 201, 301 having an actuator part 202, 302 that corresponds to a corresponding tumbler part in the first and second receiving elements 115 and 116 and a head 203, 303. The heads 203, 303 are wider than the shanks 201, 301 and form mechanical stops for the insertion of the shanks 201, 301 into the first and second receiving elements 115 and 116. In accordance with further embodiments, the actuator part 202, 302 may serve as a locking element that locks the shank 201, 301 into the corresponding one of the first and second receiving elements 115 and 116. In this case, the heads 203, 303 may be formed as a push button actuator that, when actuated, causes the actuator part 202, 302 to retract into the shank 201, 301 such that the first and second safety pins 20 and 30 can be removed from the first and second receiving elements 115 and 116.

The first and second streamers 50 and 60 are attached (e.g., tied) at opposite ends thereof to the heads 203, 303 of the first and second safety pins 20 and 30, respectively, and to the obstruction 40. The first and second streamers 50 and 60 may be formed of flexible materials, such as nylon fabric, and may include holes 51, 61 at the opposite ends thereof by which the streamers 50 and 60 can be tied to the heads 203, 303 of the first and second safety pins 20 and 30, respectively, and to the obstruction 40. As noted above, streamers would normally only be tied to the safety pins and would serve as indicators as to whether or not the safety pins were received by the receiving elements as long as the streamers were visible and not tucked away behind the product, for example. In contrast, the first and second streamers 50 and 60 are tied to the obstruction 40 and thus cannot be tucked away.

The obstruction 40 may be a rigid or semi-rigid card 41 that is disposable in a blocking position or a non-blocking position. In the blocking position, the obstruction 40 blocks the interface 112 from being viewable and serves as an indicator that the first and second safety pins 20 and 30 are received by the first and second receiving elements 115 and 116 such that the product is disabled. In this case, the first and second streamers 50 and 60 are configured to be threaded through the first and second openings 113 and 114, respectively.

The first and second openings 113 and 114 and the obstruction 40 are sized with respect to one another such that, when the obstruction 40 is disposed in the blocking position with respect to the interface 112 with the first and second streamers 50 and 60 threaded through the first and second openings 113 and 114, respectively, and the first and second safety pins 20 and 30 disposed in the first and second receiving elements 115 and 116, respectively, the obstruction 40 is irremovable from the blocking position until the first and second safety pins 20 and 30 are removed from the first and second receiving elements 115 and 116, respectively.

This effect can be seen in FIG. 1 in which a dimension (e.g., a width, W) of the obstruction 40 is substantially larger than a corresponding dimension (e.g., a diameter, D) of each of the first and second openings 113 and 114. Due to this size difference, the obstruction 40 cannot be threaded through either of the first or second openings 113 and 114. As such, the only way to remove the obstruction 40 from the interface 112 is to first remove the first and second safety pins 20 and 30 from the first and second receiving elements 113 and 114 and then to pull the obstruction 40 away from the interface 112 while reversely threading the first and second streamers 50 and 60 through the first and second openings 113 and 114, respectively, with the first and second safety pins 20 and 30 trailing.

Although the description above relates to embodiments in which two safety pins, two streamers, two openings and two receiving elements are provided, it will be understood that this is not required and that alternative embodiments exist in which only one or more than two of each component is provided. In the particular case of only one of each component being provided, the obstruction is held in place by the pull of the streamer against the opening and is large enough to remain in the blocking position regardless of an amount of slack present in the streamer.

Figure 3:
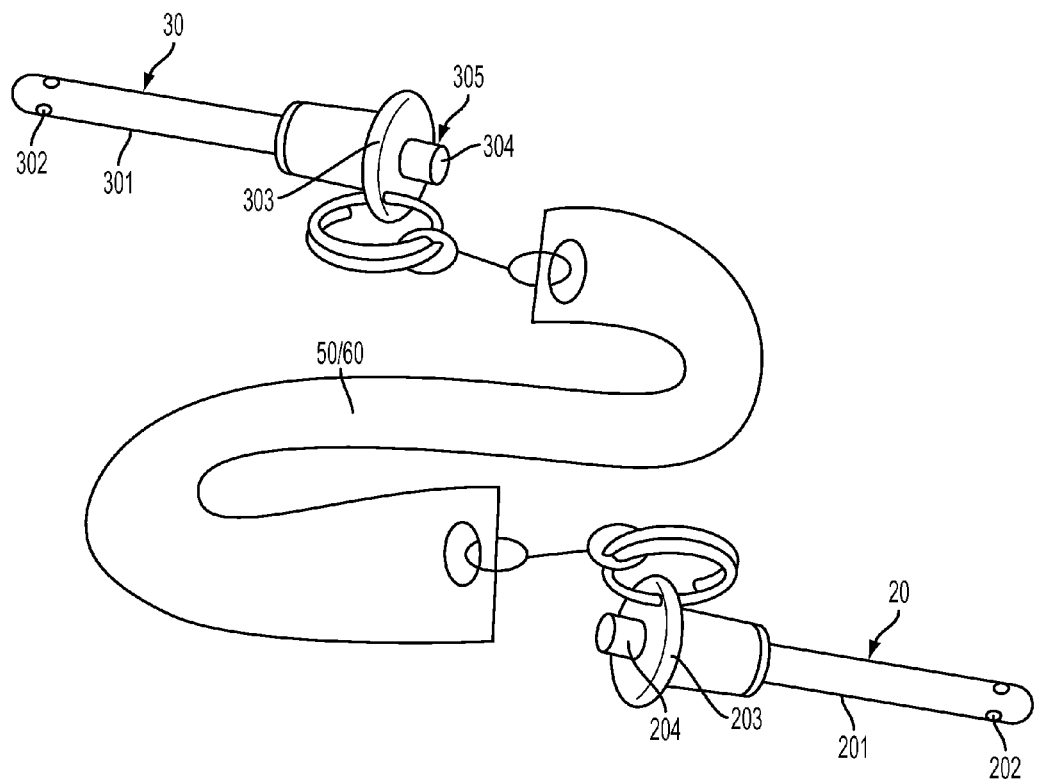
FIG. 3 is a diagrammatic view of the components of FIG. 2 in accordance with further embodiments.
Figure 4:
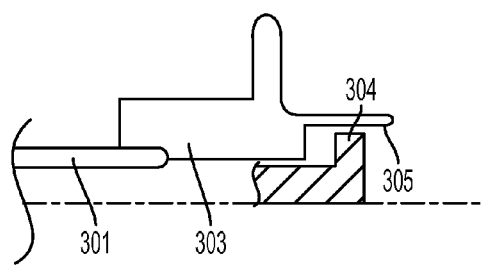
FIG. 4 is an enlarged side view of an actuator of the components of FIG. 2 in accordance with further embodiments.

In accordance with further embodiments and, with reference to FIGS. 3 and 4, the first and second safety pins 20 and 30 may be sequenced such that, for example, the first safety 20 would have to be removed from the first receiving element 115 prior to the second safety pin 30 being removed from the second receiving element 116. This sequence arises from the fact that the second safety pin 30 includes a locking element (described below) that can only unlocked by the first safety pin 20 following removal of the first safety pin 20 from the first receiving element 115.

As shown in FIG. 3, the first safety pin 20 is removably insertible into the first receiving element 115 and includes the shank 201, which is extendible into the first receiving element 115. The second safety pin 30 is removably insertible into the second receiving element 116 and includes the shank 301, which is extendible into the second receiving element 116, the head 303 at the end of the shank 301, a locking element (or actuator part 302) that is disposed along the shank 301 and is engageable to lock the second safety pin 30 in the second receiving element 116, and an actuator 304 by which the locking element (or actuator part 302) is disengageable to thereby unlock the second safety pin 30 from the second receiving element 116. The actuator 304 is configured to be actuatable to disengage the locking element (or actuator part 302) by and only by the shank 201 of the first safety pin 20.

The locking element (or actuator part 302) may be spring-loaded or otherwise biased to extend outwardly from the shank 301. In this condition, the locking element (or actuator part 302) may engage with a corresponding lockable part in the second receiving element 116 so as to lock the second safety pin 30 in the second receiving element 116. When the actuator 304 is actuated, however, the locking element (or actuator part 302) is retracted into the shank 301 such that the locking element (or actuator part 302) no longer engages with the corresponding lockable part and such that the shank 301 can be removed from the second receiving element 116.

As shown in FIG. 4, the actuator 304 may be disposed in the head 303 and may be provided as a push button. The head 303 may include a mechanical stop 305. The mechanical stop 305 may be formed as a shroud or cylindrical element surrounding the actuator 304 and may have an interior diameter that can accommodate the diameter of the shank 201 of the first safety pin 20. Thus, the mechanical stop 305 is configured to prevent the actuator 304 from being actuated except by the shank 201 of the first safety pin 20.

As shown in FIGS. 3 and 4, the first safety pin 20 is removably insertible into the first receiving element 115 and includes the shank 201, which is extendible into the first receiving element 115, the head 203 at the end of the shank 201, a locking element (or actuator part 202) that is disposed along the shank 201 and is engageable to lock the first safety pin 20 in the first receiving element 115, and an actuator 204 by which the locking element (or actuator part 202) is disengageable to thereby unlock the first safety pin 20 from the first receiving element 115. In accordance with embodiments, the actuator 204 is configured to be actuatable to disengage the locking element (or actuator part 202).

The locking element (or actuator part 202) may be spring-loaded or otherwise biased to extend outwardly from the shank 201. In this condition, the locking element (or actuator part 202) may engage with a corresponding lockable part in the first receiving element 115 so as to lock the first safety pin 20 in the first receiving element 115. When the actuator 204 is actuated, however, the locking element (or actuator part 202) is retracted into the shank 201 such that the locking element (or actuator part 202) no longer engages with the corresponding lockable part and such that the shank 201 can be removed from the first receiving element 115.

The actuator 204 may be disposed in the head 203 and may be provided as a push button.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A safety pin system for a product, the system comprising:
   a safety pin disposable in a receiving element to disable the product;
   an obstruction disposable in a blocking position of a product disability indicator; and
   a streamer configured to pass through an opening associated with the product and attached at opposite ends thereof to the safety pin and the obstruction, the opening and the obstruction being sized such that, when the obstruction is disposed in the blocking position with the streamer passed through the opening and the safety pin disposed in the receiving element, the obstruction is irremovable from the blocking position until the safety pin is removed from the receiving element.

2. The safety pin system according to claim 1, wherein the obstruction comprises a rigid or semi-rigid card.

3. The safety pin system according to claim 2, wherein a dimension of the rigid or semi-rigid card is greater than a corresponding dimension of the opening.

4. A safety pin system, comprising:
   a product including an interface by which an operational condition of the product is reviewable, an opening and a receiving element;
   a safety pin disposable in the receiving element to disable the product;
   an obstruction disposable in a blocking position at which the obstruction blocks the interface from being viewable as an indication that the product is disabled; and
   a streamer configured to pass through the opening and attached at opposite ends thereof to the safety pin and the obstruction, the opening and the obstruction being sized such that, when the obstruction is disposed in the blocking position with the streamer passed through the opening and the safety pin disposed in the receiving element, the obstruction is irremovable from the blocking position until the safety pin is removed from the receiving element.

5. The safety pin system according to claim 4, wherein the product comprises a body including a front face.

6. The safety pin system according to claim 5, wherein the interface and the opening are both provided on the front face of the body.

7. The safety pin system according to claim 6, wherein the opening and the interface are proximate to one another.

8. The safety pin system according to claim 4, wherein the interface comprises a pressure gauge.

9. The safety pin system according to claim 4, wherein the obstruction comprises a rigid or semi-rigid card.

10. The safety pin system according to claim 9, wherein a dimension of the rigid or semi-rigid card is greater than a corresponding dimension of the opening.

* * * * *